United States Patent [19]

Beuse et al.

[11] 4,415,279

[45] Nov. 15, 1983

[54] METHOD AND A METER FOR MEASURING QUANTITIES OF HEAT

[75] Inventors: Robert H. J. Beuse, Zevenaar; Han R. van Iterson, Oosterbeek; Jan W. Jansen, Brummen; Petrus H. M. Wichern, Wijchen, all of Netherlands

[73] Assignee: N.V. Tot Keuring van Elektrotechnische Materialen, Arnhem, Netherlands

[21] Appl. No.: 224,562

[22] PCT Filed: Mar. 21, 1980

[86] PCT No.: PCT/NL80/00008

§ 371 Date: Nov. 17, 1980

§ 102(e) Date: Nov. 17, 1980

[87] PCT Pub. No.: WO80/02072

PCT Pub. Date: Oct. 2, 1980

[30] Foreign Application Priority Data

Mar. 23, 1979 [NL] Netherlands ............... 79 02313

[51] Int. Cl.³ .................. G01F 1/68; G01K 17/08
[52] U.S. Cl. ............................. 374/204; 73/204
[58] Field of Search ............... 73/193 R, 204; 374/39

[56] References Cited

U.S. PATENT DOCUMENTS 2,633,747 4/1953 Lindstrom ..................... 374/39
4,085,613 4/1978 Richard ......................... 374/39

FOREIGN PATENT DOCUMENTS 2330498 1/1975 Fed. Rep. of Germany ........ 73/193
2353045 12/0197 France ........................... 73/193
279342 3/1952 Switzerland .
607001 11/1978 Switzerland ..................... 73/193

Primary Examiner—Herbert Goldstein
Attorney, Agent, or Firm—Cushman, Darby & Cushman

[57] ABSTRACT

A method and a meter for measuring the quantity of heat abstracted from a circulating flow of liquid by a consumption unit. Indirect measurement of the volume flow rate of the liquid is made, while maintaining a sub heat flow (Q shunt) from or to the main heat flow transported by the flow of liquid and measuring the temperature at some points by means of temperature sensors (4). The volume flow rate of the flow of liquid is determined on the basis of the flow rate dependent heat transfer in the boundary layer (7) of the flow of liquid at the location, where the sub heat flow (Q shunt) leaves or enters, by determining the temperature differential ($\Delta T_{i,b}$) across the boundary layer, and the sub heat flow (Q shunt) passing through said boundary layer (7). At least one absolute temperature of the flow of liquid is measured for correcting the temperature dependency of the material constants of the liquid involved in said determination of the volume flow rate.

16 Claims, 10 Drawing Figures

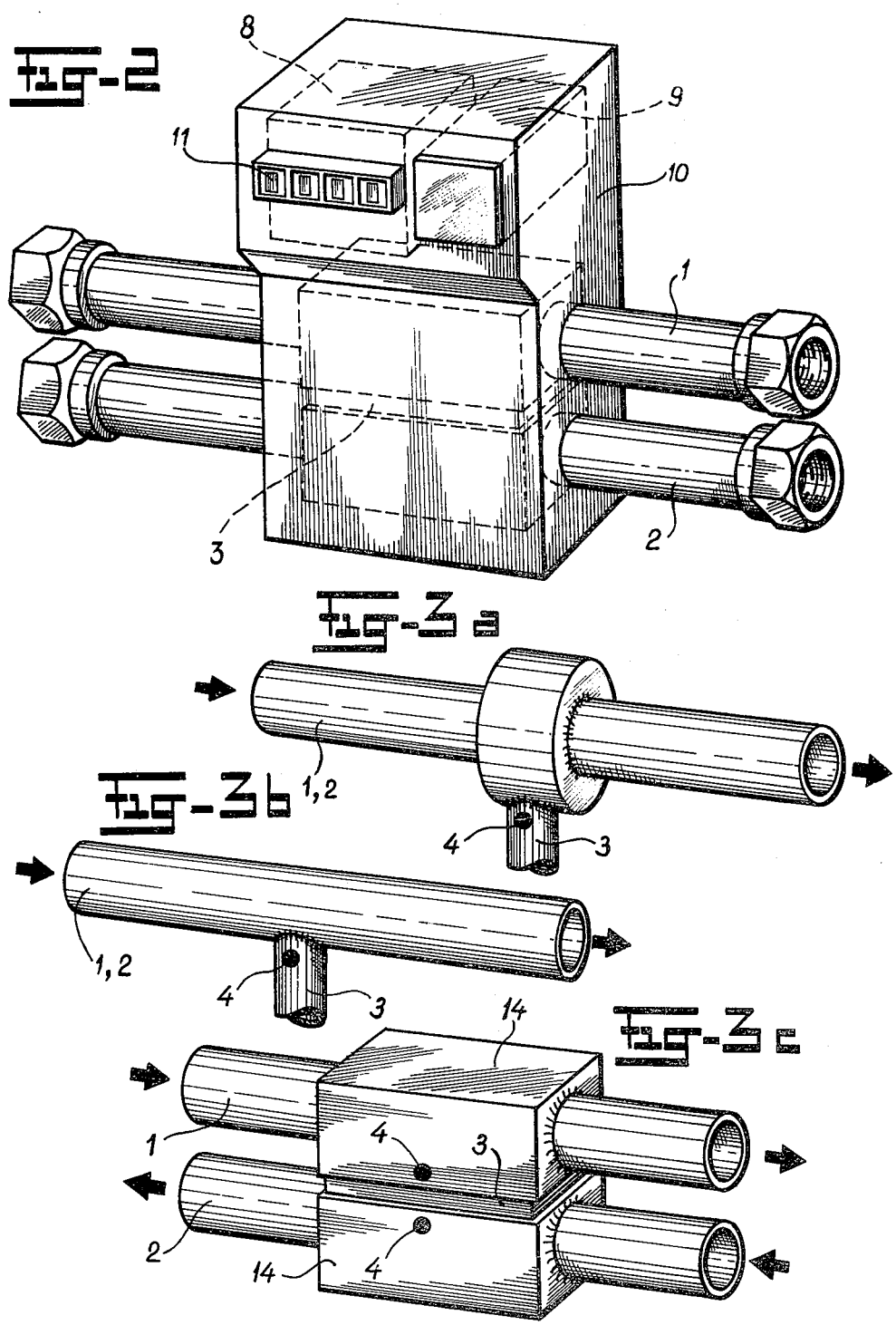

METHOD AND A METER FOR MEASURING QUANTITIES OF HEAT

BACKGROUND OF THE INVENTION

1. Field of the Invention

The invention relates to a method and a meter for measuring the quantity of heat abstracted from a circulating flow of liquid by a consumption unit based upon the indirect measurement of the volume flow rate of the liquid, while maintaining a sub heat flow from or to the main heat flow transported by the flow of liquid and measuring the temperature at some points by means of temperature sensors. Such a heat meter may for instance be provided in city-wide heating networks for consumption on small scale by the consumers. In the future, city heating networks will be used in a progressively increasing number of towns and districts in which each house will obtain a connection to a public heating network instead of its own boiler for central heating. From this connection the consumer will obtain the hot water for his home heating system and tap water supply either directly or indirectly by means of a heat exchange.

It has become evident that consumption by individual consumers (and thus total consumption) in such city heating system decreases when the amount of heat consumed by the individual consumer is measured. From the heat quantity meter the consumer will than have an idea of the cost of his heating. For this reason the installation of heat quantity meters for consumption on small scale is considered to be useful.

Existing meters such as, for instance evaporation meters, often have the drawback that they are not accurate enough. With respect to others, such as meters including turbine parts, the initial cost and/or maintenance cost are too high.

SUMMARY OF THE INVENTION

The object of the invention is to provide a method and a heat quantity meter not exhibiting the above mentioned drawbacks among other things by the complete absence of moving parts or measuring flanges in the flowing liquid so that there are no obstructions in the supply and return conduits. This will lead to a considerable decrease in maintainance of the meter.

In accordance with the invention this object is attained in that the volume flow rate of liquid is determined on the basis of the flow rate dependent heat transfer in the boundary layer of the flow of liquid at the location where the sub heat flow leaves or enters. The temperature differential across the boundary layer and the sub heat flow passing through said boundary layer is determined, while measuring at least one absolute temperature of the flow of liquid for correcting the temperature dependency of the material constants of the liquid involved in the determination of the volume flow rate.

BRIEF DESCRIPTION OF THE DRAWINGS

The present invention will now be elucidated further with reference to the annexed drawings in which like numerals denote like elements:

FIG. 2 shows a side elevation of a production embodiment of the heat quantity meter;

DESCRIPTION OF A PREFERRED EXEMPLARY EMBODIMENT

Figure 1A:
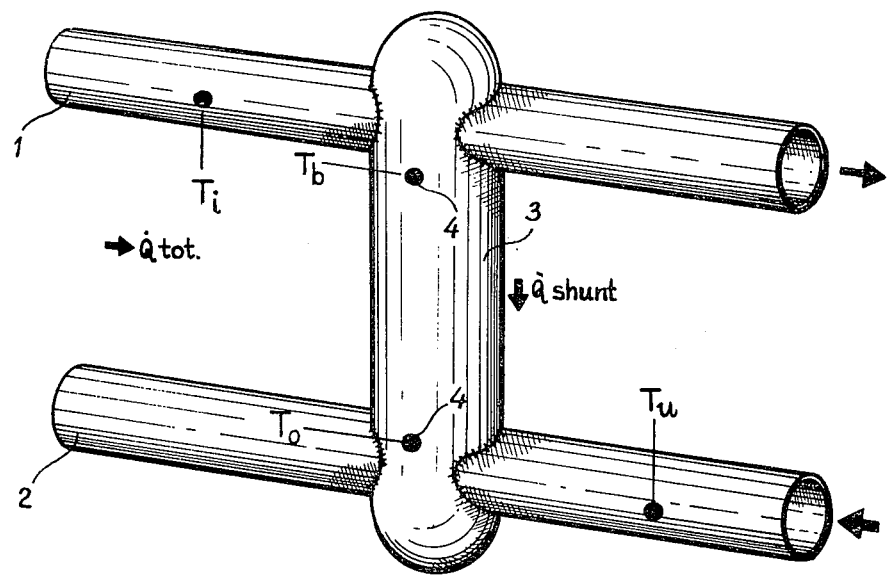
FIG. 1a shows a basic sketch of the conduit sections including a thermal shunt connection of the heat quantity meter.

The operation of the heat quantity meter in accordance with the present invention is based solely on the measurement of a number of temperatures. Use is made of the fact that the heat transfer between the heat carrier or flowing liquid and a body, in which or along which this liquid is transported, is dependent, among other things, on the flow rate of the liquid at the relevant location. The more this flow rate increases the better the heat transfer will become. It is now aimed at measuring this coefficient of heat transfer.

When employing this method easily measurable temperature differentials occur without being accompanied by large (and consequently unacceptable) heat losses in the main flow as in a thermal flowmeter. In a known flowmeter as is for instance known from the French Pat. No. 2,353,045 one tries to minimize the influence of the laminar sub or boundary layer among others by a special shape of the wall surrounding the flow of liquid. In the present method and meter a measurement is made of the coefficient of heat transfer of the laminar sub layer of the flow of liquid considered to be turbulent.

Where this measurement can not be performed directly a sub or leakage heat flow is allowed to form which is dependent on the coefficient of heat transfer. For this purpose there is provided an energy connection or, in particular, a thermal connection between the supply and drain or return conduit.

In the connection thus provided there will occur a heat flow dependent on the difference in temperature between the hot water in the supply conduit and the cooled water in the return conduit as well as on the total heat resistance. This total heat resistance consists of a fixed component determined by the thermal connection possibly in combination with the walls of the conduits, and of a variable component mainly determined by the flow of the liquid in the thermal boundary layers. The magnitude of this branched heat flow may be measured by means of a temperature differential measurement. The magnitude of the temperature differential across one or both of the boundary layers together with the magnitude of the heat flow through the connection determine the coefficient of heat transfer in situ.

In the general case of an energy connection, apart from the heat flow by conduction, radiation or convection a heat transport due to thermo-electric effects may also occur if the connection is electrically conductive. The electric current generated in this case (possibly by the Seeback effect) will than be a measure for this form of energy or heat transport.

The absolute temperatures of the flows of liquid at the location of the boundary layers are also of importance, because the relevant material constants, like the coefficient of heat conduction, the specific heat c (weakly), and the vicosity θ (strongly), are dependent on temperature.

The coefficient of heat transfer together with the several material constants fixedly determine the velocity gradient in the boundary layer. If the velocity profile in the conduit is also governed and reproduceable, then there will be an unambiguous relation between several temperatures and the volume flow rate of the liquid, and consequently between these temperatures and the net heat flow rate.

The signals supplied by the temperature sensors are processed in accordance with an empirically determined relation by an electronic unit into a quantity of heat per each unit of time or a time pulse per quantity of heat. By employing an integrating, summing or pulse counter circuit in the electronic unit a total supplied quantity of heat per each chosen period of time can be accumulated.

By having the meter constructed symmetrically both the volume flow rate in the hot supply conduit and in the colder drain conduit may be determined and compared with each other.

With reference now to FIG. 1a there is shown a basic sketch of a meter in accordance with the present invention in which the reference numeral 1 indicates the supply conduit, the reference numeral 2 indicates the drain or return conduit and the reference numeral 3 indicates the bar shaped thermal shunt connection. The temperatures $T_i$, $T_b$, $T_o$, $T_u$ or temperature differentials may be measured by means of sensors 4, such as thermo-couples, to which a sensitive amplifier is connected. The thermo-couples may be soldered onto or into the material.

Figure 1B:
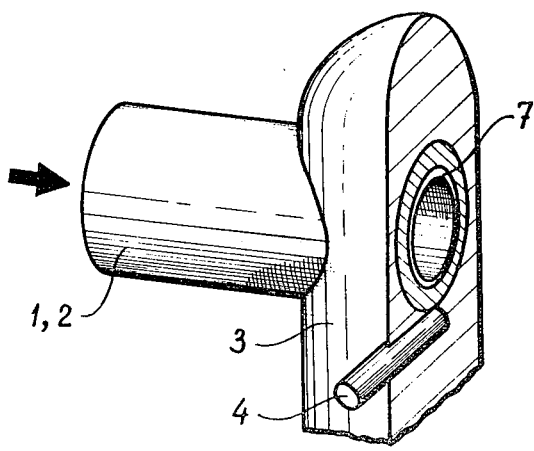
FIG. 1b shows a side elevation of a part of a conduit section having a bar shaped shunt connection according to FIG. 1a fastened thereto by means of an angular junction.

With reference to FIG. 1b there has been shown a side elevation of a cross section of the angular junction of the thermal shunt connection 3 to one of the conduits 1 or 2. Likewise the laminar boundary layer 7 of the liquid at the tube wall of the conduits has been indicated. The reference numeral 4 denotes the junction contact of the temperature differential sensor. This temperature differential sensor may also consists of two separate absolute temperature sensors.

For this type of heat transfer problems concerning the boundary layer one may apply a theory known in the theory of flows as the so called "film theory". In turbulent flows of liquid (as will occur in the supply and the drain conduits) one may consider the larger part of the velocity gradient and the entire temperature gradient to be in the laminar sub layer at the wall. In general one may start from the empirical relation:

$$Nu = 0.024\left(1 + \frac{D}{L}\right)^{0.66} \cdot Re^{0.8} \cdot Pr^{0.33} \cdot \left(\frac{\eta_{vl}}{\eta_w}\right)^{0.14} \quad (1)$$

in which:

Nu is the Nusselt number which is a measure for the coefficient of heat transfer α of the boundary layer.

$$\left(1 + \frac{D}{L}\right)$$

is a correction factor accounting for the inlet or starting area of the thermal boundary layer and including therein the ratio of the conduit or pipe diameter D and the distance L over which the heat transfer occurs.

Re is the Reynolds number relating the specific mass ρ, the rate of flow rate v and the conduit diameter D with the viscosity η of the liquid.

Pr is the Prandtl number indicating the ratio between impulse transport (friction) and heat transport. This is an assembly of material constants, such as the specific heat c, the viscosity η and the specific conductivity λ of the liquid. This therefore is a (temperature dependent) material constant per se.

$$\left(\frac{\eta_{vl}}{\eta_w}\right)$$

is a correction term for the fact that the viscosity of the liquid in the turbulent center portion differs from that directly at the wall where a different temperature will prevail.

The relation (1) indicates that the coefficient of heat transfer α is about proportional to the output or volume flow rate to the power 0.8.

A second relation, i.e. the generally known relation also applies to the meter of FIGS. 1a, b:

$$Q_m = \int \rho c \phi \Delta T_{i,u} dt \quad (2)$$

in which $Q_m$ is the quantity of heat that the meter will have to indicate

ρ is the specific mass of the liquid c is the specific heat capacity

φ is the output or the volume flow rate $\Delta T_{i,u}$ the difference in temperature between supplied and discharged flow dt is the factor time to which the integration is performed.

When one takes the derivative of relation (2) (because this also provides for a simple electronic analog), and combines both the relations (1) and (2) the result will be $$\dot{Q}_m = f(\lambda, \eta, \eta_w, c, D, L)\alpha^{1.25}\Delta T_{i,u} \quad (3)$$

in which $\dot{Q}_m$ is the first derivative of the quantity of heat, i.e. the heat flow per each unit of time $f(\lambda, \eta, \eta_w, c, D, L)$ is a function of the aforesaid material constants and of the dimensions of the meter. When used in practice f will be mainly a function of $T_i$ and to a lesser degree of $\Delta T_{i,u}$ α is the expected actual coefficient of heat transfer.

$\Delta T_{i,u}$ is the difference in temperature between the supplied and discharged flow.

Consequently relation (3) may also be written as follows $$\dot{Q}_m = f(T_i, \Delta T_{i,u})\alpha^{1.25}\Delta T_{i,u} \quad (4)$$

This makes it clear that for determining $Q_m$ it suffices to determine $T_i$, α and $\Delta T_{i,u}$. This may be performed by measuring four temperatures in the meter box.

Figure 1C:
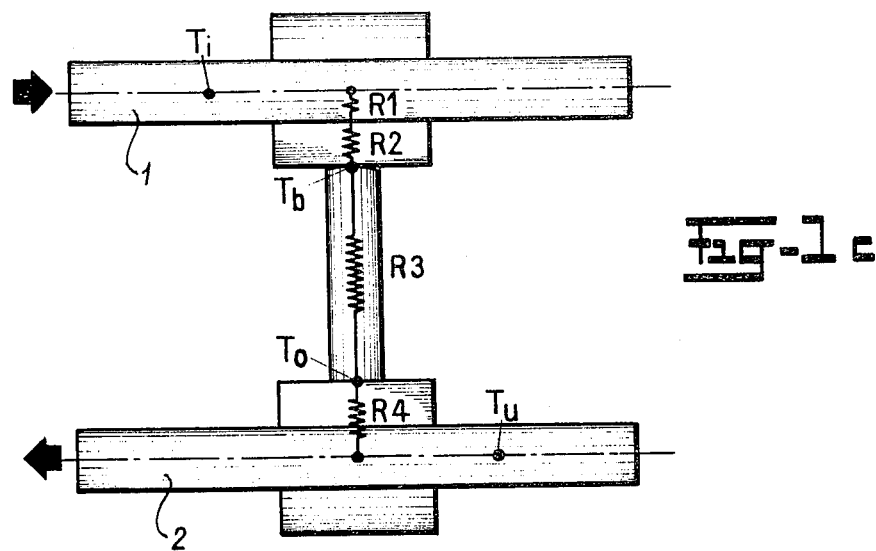
FIG. 1c discloses a diagrammatical view of the heat quantity meter including its temperature measuring points and the imaginary heat resistances R1 to R4, inclusive.

FIG. 1c diagrammatically shows the supply and the return conduit including the thermal shunt connection. In these parts there have been drawn the imaginary heat resistance $R_1$ to $R_4$ inclusive while it has been indicated diagrammatically at which points the four temperatures $T_i$, $T_u$, $T_b$, $T_o$ are measured. Therein:

$R_1$ is the heat resistance of the boundary layer at the hot side, $R_2$ is the heat resistance of the tube raw material and the composite body, $R_3$ is the heat resistance of the thermal shunt connection, and $R_4$ is the heat resistance of the boundary layer and the material resistance at the colder side.

The first resistance $R_1$, the boundary layer resistance, is formed by the coefficient of heat transfer $\alpha$ (which has to be determined) and the surface area F across which the thermal shunt connection abstracts heat from the flow in the conduit. This surface area is substantially fixed by the dimensioning of the meter. The edges are subject to some displacement beyond the original area, and the heat transfer by the pipe walls outside the composite body also will play a role upon decreasing flow of liquid. This increase of surface area will be indicated below as the border (line) effect.

The second indicated resistance $R_2$ is formed by the intermediate material because a direct measurement of the wall temperature is difficult. The third resistance $R_3$ is that of the shunt connection between $T_b$ and $T_o$, which resistance determines the heat transport by the first two resistances.

The coefficient of heat transfer $\alpha$ may be determined by measuring $\Delta T_{i,b}$ and the heat transport in accordance with $$\alpha = \frac{1}{FR_1} \quad (5)$$

and $$\frac{R_1 + R_2}{\Delta T_{i,b}} = \frac{R_3}{\Delta T_{b,o}} \quad (6)$$

which may be combined as follows $$\alpha = \left\{ FR_3 \times \frac{\Delta T_{i,b}}{\Delta T_{b,o}} - FR_2 \right\}^{-1} \quad (7)$$

By combining the relation (7) with the relation (4) the following is obtained $$Q_m = f_1(T_b, \Delta T_{i,u}) \cdot f_2(\Delta T_{i,b}/\Delta T_b) \cdot \Delta T_{i,u} \quad (8)$$

Based on their theory it appears to be possible indeed to determine the heat consumption by measuring four temperatures.

From these temperatures the differential values $\Delta T_{i,u}$, $\Delta T_{i,b}$ and $\Delta T_{b,o}$ as well as the quotient of the latter two may be calculated. Subsequently these arguments are translated with the aid of tables and the two above mentioned function values, whereupon two multiplication operations provide the instantaneous heat consumption $\dot{Q}_m$.

The above noted function curves ($f_1$, $f_2$) have been determined empirically. In order to explain this measurement, relation (2) should again be compared with relation (8). It then appears that it will be necessary to investigate the relation between on the one hand $\rho c\phi$ and on the other hand $$\frac{\Delta T_{i,b}}{\Delta T_{b,o}}, T_i \text{ and } \Delta T_{i,u}.$$

Figure 1D:
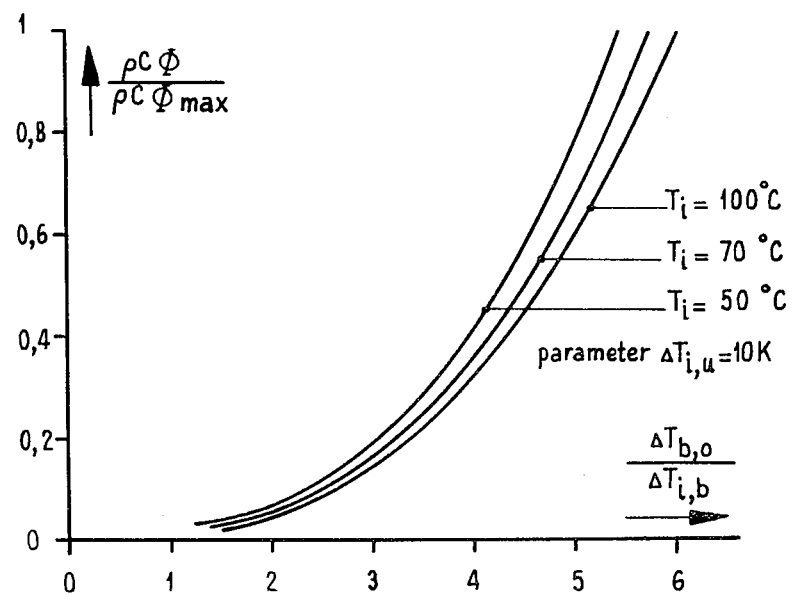
FIG. 1d discloses the relation between the measured volume flow rate and the measured temperatures.

FIG. 1d shows the relation between the measured volume flow rate and the measured temperatures when performing this type of test. Along the ordinate the normalized value of the product $\rho c\phi$ has been plotted and along the abscissa the invert quotient of the measured temperature differentials $\Delta T_{i,b}$ and $\Delta T_{b,o}$, while the temperature $T_i$ occurs as parameter. These measurements have been performed at a fixed value of $\Delta T_{i,u}$. Based on a number of tests (in which special attention was paid to the reproducability) it was concluded that it is possible to record the course of the function of $$\rho c \phi \text{ and } \frac{\Delta T_{i,b}}{\Delta T_{b,o}}$$

in one table and that simple corrections of arithmetic nature could be introduced in the table values to compensate for the influences of $T_i$ and $T_{i,u}$.

By correctly shaping the shunt connection as regards length and cross section, in conjunction with the choice of materials for the connection and the tube, together with the associated coefficients of heat conductivity, it appears to be possible to keep the course of the quotient $$\frac{\Delta T_{i,b}}{\Delta T_{b,o}},$$

as the function of the volume flow rate (over a $C\phi$ measuring range of 1 to 40), between the limits of $\frac{1}{8}$ to 8. This provides to acceptable measurable temperature differentials $\Delta T_{i,b}$ or $\Delta T_{b,o}$ at a given minimum temperature differential between supplied and drained flow of ($\Delta T_{i,u}$) of 10° C.

The calculation of the differences, quotients, products and the handling of the table including the introduction of arithmetical corrections of the results is performed in this instance by a micro computer in IC-format.

With reference to FIG. 2 there has been shown a possible embodiment of the heat quantity meter according to the invention. In this figure the reference numerals 1 and 2 indicate the supply and drain conduits, respectively, the reference numeral 10 the housing of the meter, the reference numeral 8 the electronic processing unit, the reference numeral 9 the electric power unit and the reference numeral 11 the reading panel (display).

An electronic signal processing unit capable of computing the total heat flow from four absolute temperatures on the basis of relation (8) has been realized by means of micro electronics as already used in pocket computers. In view of the micro electronics already present this meter will possess additional possibilities such as telemetric reading, control of system functioning, day/night/season tariff, etc.

Also within the scope of the invention the meter may be applied solely for the determination of volume flow rates of liquids.

Such important aspects with regard to the measurement principle of the present heat quantity meter are among others:

a. The dimensions of the heat transferring surface area within the conduits and the dimensions or nature of the thermal shunt connection.

b. The absence of requirement of a shunt connection for creating a partial or sub heat flow. Even a (measurable) heat exchange to or from the surroundings offers the possibility to determine the properties of the boundary layer and consequently the volume flow rate via temperatures.

c. The influence of foreign components in the water circulation that might deposit on the wall and might consequently influence the heat resistance of the boundary layer;
d. The flow profile of the flows of liquid and the contacting of the heat transferring surfaces;
e. The choice of the temperature measurement points in or on the thermal shunt connection and the choice of the shape by means of which the shunt connection is coupled to one or both of the conduits.

With respect to item a, above the surface in which the thermal connection is joined to the conduit, is limited. The heat transport by this connection is continued not only at the location of this junction but also in the surrounding conduit walls. The influence of this border effect is dependent on the wall thickness of the conduit, the coefficient of heat conductivity of the materials used and the coefficient of heat transfer of the flowing liquid to the conduit wall and consequently on the volume flow rate.

The border line effect tends to cause a deterioration of the non-linear relation between the temperatures to be measured and the heat flux to be determined. The influence of this border effect may be restricted by thinning the conduit wall at the location of the edges with the thermal connection or by providing a piece of insulating material (5 in FIG. 4).

With reference to FIGS. 3a and b there have been shown to examples of a conduit section including a shunt connection fastened thereto by means of a point junction, (FIG. 3b) and a conduit section including a shunt connection 3 fastened thereto by means of an annular function (FIG. 3a). In both the embodiments the border effects will act differently. The ratio of edge length to transfer area is larger for the point junction than for the annular junction. Moreover, the point junction possesses edges in the longitudinal direction of the flow whereas the annular junction possesses only edges in the transverse direction.

With reference to FIG. 3c there has been shown a further variant of the annular junction in which the block shaped shunt connection is brought in contact with the flows over a greater length than width. The participation of the edges is thereby relatively small. The junction pieces 14 consist of a good heat conductive material, such as copper, whereas the fixed resistance part 3 between the junction pieces 14 is made however of a less heat conductive material, such as stainless steel, so that within a small volume efficient heat resistance is provided. The highly conductive junction pieces 14 and 14 lessen the critical character of mounting the temperature sensors for measurement of $T_o$ and $T_b$.

Figure 3D:
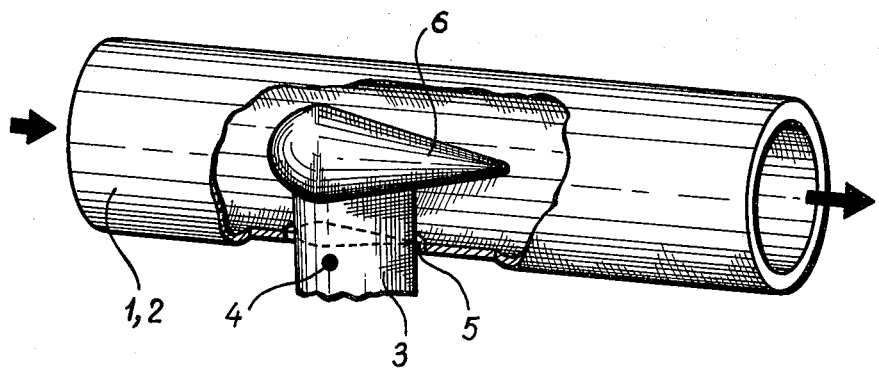
FIGS. 3a, b, c, and d show a side elevation of four variants of the junction of the shunt connection to a conduit section.

With reference to FIG. 3d there has been shown a side elevation of a coupling body 6 arranged coaxially within a conduit section 1, 2 at the end of the thermal connection 3. The coaxial arrangement has the advantage that the flow rate in the center of the conduit contributes most to the output. Moreover the flow contacting form of the coupling body may be chosen in such a manner that there will be a simple relation between the heat transport through the conduit and the temperature differential measured across the thermal connection. It has therein clearly been indicated that a thermal insulation ring 5 may be provided between the thermal connection 3 and the wall of the conduit 1, 2 in order to suppress an optional heat transfer from or to the wall of the conduit.

With respect to the foregoing item b, in those systems in which the supply and the drain are not near enough to each other and the heat transport for the sub flow by means of Peltier effects is impossible or is hampered by practical considerations, it is possible to make the desired heat transport occur from the supply conduit to the surroundings or visa versa by means of a cooling or heating body. In that case the drain conduit is necessary for determining the volume flow rate of the liquid and/or the heat output. However, the sub heat flow to or from the surroundings will have to be measured because this flow keeps playing a roll in the electronic signal processing.

The same may be performed with the drain conduit, however, in that case the temperature differential with respect to the surroundings will be much smaller and the direction of the sub heat flow will also run from the inside to the outside.

With respect to item c above, substances for preventing corrosion are often added to the circulating water of the city heating network. In the future, presumably yet other substances may be added in order to operate at a lower stowing force of the pumps (drag reduction). It may be possible that some substances will influence the heat transfer properties of the liquid boundery layer to the walls. No indications of this sort however, have yet been found by tests including oxide particles, salt solutions and suspensions. Accordingly the fear of such effects has been is greatly lessened.

With respect to item d above, the relation between the water output or volume flow rate of the water and the variable heat resistance is determined by physical effects in the boundary layer. In a turbulent flow of liquid (as is the case in the present heat meter) one may presume that substantially the main part of the flow rate gradient and the entire temperature gradient is to be found in the laminar boundary layer. This boundary layer has a thickness in the magnitude of some tenths of micrometers.

The profile of the flow determines the relation between the output and the flow rate gradient at the location of the boundary layer. The profile of the flow should therefore be controlled in order to maintain the relation between temperatures and heat flux. Bends, valves, couplings, etc have their own influence on the profile of the flow, so that the length of the conduit of the heat meter is bound to a minimum, presently ten times its own diameter. The interfering influences of the above mentioned accessories may be suppressed by correctly shaping the inlet opening so that a shorter length of the conduit of the heat meter may suffice.

Figure 4:
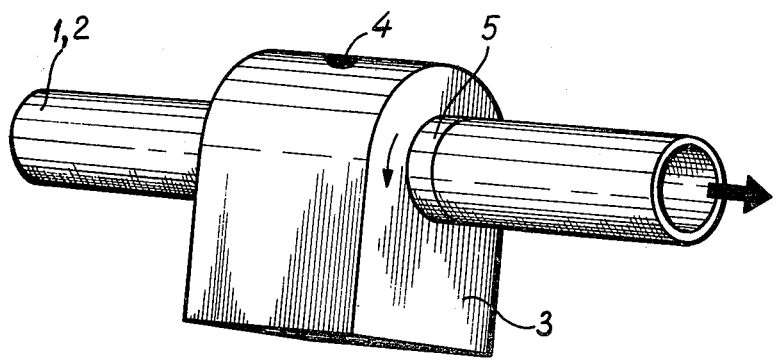
FIG. 4 shows a side elevation of a variant of the location of a temperature sensor.

With respect to item e above, in a connection constructed like represented in FIG. 4 the field of isotherms, by means of which the heat flow via the boundary layer manifests itself in the materials of the conduit wall and shunt connection, is not radially symmetric. A symmetrical field is, of course, impossible because the heat ultimately has to flow in one direction, for instance towards the other conduit. The heat flow occurring in the head side of the connection (at 4 in FIG. 4) will have to flow via the sides of the central middle portion. Consequently an additional decrease in temprature will occur in the sides. This additional decrease in of temperature appears to be dependent on the flow. This is because increasing volume flow rate of the liquid causes the boundary layer resistance to become smaller so that the material resistances will become of greater influence on the heat flow lines in the sides. As a result thereof there will occur a different temperature distribution.

Empirically it has been found possible to give the junction according to FIG. 4 such dimensions that the change in the $T_{i,b}$ signal, by measuring at the head side (point 4), causes such a change in the quotient $\Delta T_{i,b}/\Delta$ that the relation between this quotient and the volume flow rate or output of liquid may be straightened within acceptable limits over the entire measuring range from 1 to 40. The term "acceptable" should thereby be understood as 1% within the final answer.

We claim:

1. A method for measuring the quantity of heat abstracted from a circulating flow of liquid by a consumption unit of the type including the steps of indirectly measuring the volume flow rate of the liquid while maintaining a subsidiary heat flow with respect to the main heat flow transported by the flow of liquid, measuring the temperature at some points by means of temperature sensors, and computing said quantity of heat from said temperature measurements, characterized in that said determining volume flow rate of the liquid is made on the basis of the flow rate dependent heat transfer in the boundary layer of the flow of liquid at the location of the subsidiary heat flow and includes the steps of:

measuring the temperature differential ($\Delta T_{b,o}$) across a fixed heat resistance in a part of the path of the subsidiary heat flow outside the boundary layer thus establishing the subsidiary heat flow;

measuring the temperature differential ($\Delta T_{i,b}$) across the boundary layer; establishing indicia of the quotient ($\Delta T_{i,b}/\Delta T_{b,o}$) of the two temperature differentials;

measuring the absolute supply temperature ($T_i$) of the flow of liquid for correcting the temperature dependency of the material constants of the liquid;

measuring the temperature differential ($\Delta T_{i,u}$) of the flow of liquid across the consumption unit; and determining said quantity of abstracted heat from said quotient ($\Delta T_{i,b}/\Delta T_{i,o}$), said absolute supply temperature ($T_i$) and the temperature differential ($\Delta T_{i,u}$) of the flow of liquid across the consumption unit.

2. The method of claim 1 characterized in that said establishing indicia step includes the step of determining the quotient of the temperature differential across the fixed heat resistance and the temperature differential across the boundary layer by means of an electronic computation circuit as a measure for the flow rate dependent heat transfer in the boundary layer.

3. The method of claim 2, characterized in that said determining said quantity step includes the step of determining, by means of said electronic computation circuit, the volume flow rate employing a relation also determined by the shape of heat quantity meter to be used and the material constants of the liquid.

4. A heat quantity meter for measuring heat abstracted from a circulating flow by a consumption unit comprising a conduit section for the flow of the liquid to be supplied, a conduit section for the flow of liquid to be drained, a shunt connection having junctions with both said conduit sections to obtain a subsidiary heat flow with respect to the main heat flow of said liquid, said shunt connection having a fixed heat resistance associated therewith and at least a first temperature sensor disposed on the supply conduit section and a second temperature sensor disposed on the drain conduit section, characterized in that;

two additional temperature sensors are provided, disposed on the shunt connection on respective sides of the heat resistance thereof and further characterized in that; the shunt connection is of predetermined length, cross section and junction surface area at the junction with the supply conduit section; and the shunt connection and at least the portion of said supply conduit section at the junction with the shunt connection are formed of a material having a predetermined coefficient of heat conductivity, said predetermined length, cross section, junction surface area and heat conductivity coefficient being chosen such that the quotient of the temperature differential across the boundary layer of the flow of liquid at the location of the junction with the shunt connection and the temperature differential across the fixed resistance of the shunt connection lies between $\frac{1}{8}$ and 8 for the entire operative measurement range of volume flow rates.

5. The heat quantity meter of claim 4, characterized in that said shunt connection includes a fixed thermal resistance disposed in the middle portion thereof, and at least the supply conduit section is coupled to the shunt connection by means of an annular junction, the shape of the end of said junction turned away from the fixed heat resistance being such that for higher volume flow rates of the liquid the transferred subsidiary heat flow leads to an additional temperature difference in said end, one of the two temperature sensors for measuring the temperature differential across the heat resistance being disposed on said end, so that this additional temperature difference will contribute in compensating a possible non-linear relation between the quotient and the volume flow rate of the liquid.

6. The heat quantity meter of claim 4 or 5, characterized in that the supply conduit section outside said junction with the shunt connection is formed of a material having a second heat conductivity coefficient so that the subsidiary heat flow in the shunt connection is governed by the heat transfer of the boundary layer at the location of said junction.

7. The heat quantity meter of claims 4 or 5, further including an electronic computation circuit for determining the temperature differentials, for determining the said quotient, for deriving the volume flow rate of the liquid from the quotient in accordance with a predetermined relation, for correcting the temperature dependency of the material constants, and for multiplying the volume flow rate thus obtained with the temperature differential between the flow of liquid in the supply conduit and the drain conduit.

8. The heat quantity of claim 7, characterized in that the electronic computation circuit includes an integrating circuit for determining the quantity of heat transferred per each time unit to the consumption unit.

9. The heat quantity meter of claim 6, further including an electronic computation circuit for determining the temperature differentials, for determining said quotient, for deriving the volume flow rate of the liquid from the quotient in accordance with a predetermined relation, for correcting the temperature dependency of the material constants, and for multiplying the volume flow rate thus obtained with the temperature differential between the flow of liquid in the supply conduit and in the drain conduit.

10. Apparatus for determining the volume flow rate of a liquid through a conduit, said liquid including a laminar boundary layer adjacent to the walls of said conduit, and said liquid having various material constants associated therewith, said apparatus comprising:

first temperature sensor means for generating a signal indicative of the temperature ($T_i$) of the liquid in said conduit, said temperature being indicative of said liquid material constants;

means for generating signals indicative of heat transfer through said boundary layer, including a thermal shunt member, of predetermined thermal resistance, thermally coupled at one end to said conduit, the other end thereof being maintained at a temperature different from the temperature of said one end, thereby inducing a subsidiary heat flow with respect to the heat flow transported by the flowing liquid in said conduit in accordance with the flow rate dependent heat transfer through the boundary layer;

a second temperature sensor means for generating a signal indicative of the temperature ($T_b$) in the shunt member near said one end; and a third temperature sensor means for generating a signal indicative of the temperature ($T_o$) in the shunt member near said other end; and electronic processing means responsive to said signals, for determining a quantity indicative of the quotient of the temperature differential ($\Delta T_{i,b}$) across the boundary layer and the temperature differential ($\Delta T_{b,o}$) across the shunt member thermal resistance and for determining said volume flow rate from said temperature differential quotient and said liquid temperature dependent function of the material constants.

11. Apparatus for determining the volume flow rate of a liquid flow to a consumption unit in a system wherein said liquid flow is provided to said consumption unit through a supply conduit and removed from said unit by a return conduit, said liquid flow including a laminar boundary layer adjacent to the walls of said conduits, and said liquid having various material constants associated therewith, said apparatus comprising:

a thermal shunt member, of predetermined fixed thermal resistance, thermally connecting said supply and return conduits, for establishing a leakage heat flow, with respect to the heat flow transported by the flowing liquid in said conduits, therethrough in dependence of the flow rate dependent heat transfer in the boundary layer in one of said conduits;

a first temperature sensor means for generating a signal indicative of the temperature ($T_i$) of the liquid in said supply conduit, said liquid material constants being a function $f(T_i)$ of said supply liquid temperature; a second temperature sensor means for generating a signal indicative of the temperature ($T_b$) of said shunt member in the proximity of said supply conduit; a third temperature sensor means for generating a signal indicative of the temperature ($T_o$) of said shunt member in the proximity of said return conduit; and electronic processing means, responsive to said signals, for determining a quantity indicative of the quotient of the temperature differential ($\Delta T_{i,b}$) across the boundary layer and temperature differential ($\Delta T_{b,o}$) across the shunt member thermal resistance and for determining said volume flow rate from said temperature differential quotient and said liquid temperature dependent function of the material constants.

12. The apparatus of claim 11 adapted for determining the quantity of heat drawn from said liquid flow by said consumption unit, said apparatus further comprising a fourth temperature sensor means for generating a signal indicative of the temperature ($T_u$) of the liquid in said return conduit, and wherein said electronic processing means includes means for generating indicia of a quantity equal to volume flow rate multiplied by the difference in temperature between the liquid in the supply conduit and the liquid in the return conduit.

13. The apparatus of claim 11 wherein said shunt member comprises a first portion having relatively low heat resistance in thermal connection with said supply conduit, said second temperature sensor being disposed in said shunt member first portion in proximity to said supply conduit;

a second portion having relatively low heat resistance in thermal connection with said return conduit, said fourth temperature sensor being disposed in said shunt member second portion in proximity to said return conduit; and a third portion having relatively high heat resistance thermally coupling said first and second portion.

14. The apparatus of claim 13 wherein said shunt member first and second portions are in part annular shaped and surround a portion of said conduits.

15. Apparatus for determining the flow rate of a liquid through a conduit, said liquid having a laminar layer adjacent to the walls of said conduit, said apparatus comprising:

a thermal shunt member, thermally coupled at one end to said conduit; and having a fixed thermal resistance between said one end and the second end thereof, a leakage heat flow being maintained through said shunt member;

a first temperature sensor for generating a signal indicative of the temperature ($T_i$) of the liquid in said conduit;

a second temperature sensor for generating a signal indicative of the temperature ($T_b$) of said shunt member one end in proximity to said conduit;

a third temperature sensor for generating a signal indicative of the temperature ($T_o$) at said shunt member second end; and electronic processing means, responsive to said temperature signals, for generating indicia of the quantity $(T_i-T_b)/(T_b-T_o)$, said quantity being indicative of said flow rate.

16. The apparatus of claim 15, wherein said shunt member one end includes first and second portion, said first portion being generally annular shaped portion surrounding a portion of said conduit, said second temperature sensor being disposed in said second portion.

* * * * *

UNITED STATES PATENT AND TRADEMARK OFFICE
CERTIFICATE OF CORRECTION

PATENT NO. : 4,415,279

DATED : November 15, 1983

INVENTOR(S) : BEUSE et al

It is certified that error appears in the above-identified patent and that said Letters Patent is hereby corrected as shown below:

Column 9, line 42, change "$(\Delta T_{i,b}/\Delta T_{i,o})$" to --$(\Delta T_{i,b}/\Delta T_{b,o})$--.

Signed and Sealed this

Thirteenth Day of March 1984

[SEAL]

Attest:

GERALD J. MOSSINGHOFF

Attesting Officer     Commissioner of Patents and Trademarks